(12) United States Patent
Fischer

(10) Patent No.: US 6,236,723 B1
(45) Date of Patent: May 22, 2001

(54) COMPUTER/TELEPHONY INTEGRATION LOGGING APPLICATION

(75) Inventor: Lawrence E. Fischer, Belfair, WA (US)

(73) Assignee: Aspect Communications, San Jose, CA (US)

( * ) Notice: Subject to any disclaimer, the term of this patent is extended or adjusted under 35 U.S.C. 154(b) by 0 days.

(21) Appl. No.: 09/106,922

(22) Filed: Jun. 29, 1998

(51) Int. Cl.[7] .................................................. H04M 3/00
(52) U.S. Cl. .............................................. 379/265; 379/260
(58) Field of Search .................................. 379/34, 35, 36, 379/265, 266

(56) References Cited

U.S. PATENT DOCUMENTS

| | | | |
|---|---|---|---|
| 5,001,710 | 3/1991 | Gawrys et al. | 370/110.1 |
| 5,749,077 | * 5/1998 | Campbell | 705/36 |
| 5,778,178 | 7/1998 | Arunachalam | 395/200.33 |
| 5,884,032 | 3/1999 | Bateman et al. | 395/200.34 |
| 5,923,899 | * 7/1999 | Sasmazel et al. | 717/5 |
| 5,933,492 | * 8/1999 | Turovski | 379/309 X |
| 6,018,578 | * 1/2000 | Bondarenko et al. | 379/93.23 X |
| 6,055,308 | * 4/2000 | Miloslavsky et al. | 379/201 X |
| 6,101,486 | * 8/2000 | Roberts et al. | |

* cited by examiner

*Primary Examiner*—Creighton Smith
(74) *Attorney, Agent, or Firm*—Blakely, Sokoloff, Taylor & Zafman

(57) ABSTRACT

An automated transaction processing system implements a method for tracking information regarding electronic transactions received by an automated transaction processing system. The method includes the steps of initializing an output file and receiving multiple messages related to a transaction. Each of the messages has several parameters, at least one of which is alphabetic or alphanumeric. The method also includes the steps of converting the associated parameters to a comma separated variable (CSV) format, storing the associated parameters in the CSV format in the output file, and transferring the output file to a database.

16 Claims, 5 Drawing Sheets

COMPUTER/TELEPHONY INTEGRATION LOGGING APPLICATION

FIELD OF THE INVENTION

The present invention is in the field of automated transaction processing systems, where transactions may include telephone calls, electronic mail messages, voice mail messages, and network sessions.

BACKGROUND OF THE INVENTION

Modem businesses rely increasingly on their ability to communicate with customers and other businesses in a fast, efficient manner around the clock. Most businesses use some form of automated transaction processing equipment that includes hardware and software to receive and route transactions such as telephone calls, electronic mail messages, voice mail messages, and network sessions. For example, a securities firm may use automated transaction processing equipment to answer the telephone, extract identifying information from the caller (such as an account number), access stored information about the caller and/or the caller's account, and use the information to route the call to an agent. An agent may be another automated transaction processing device or a human agent who has a telephone and a computer terminal.

Many automated transaction processing systems use computer/telephony integration (CTI) which is a process that allows telephony signals and computer-based signals to interact. For example, a particular CTI application allows computer applications to answer incoming calls, and to provide information, typically from a database, on-screen at the same time the call comes in.

For businesses that use automated transaction processing systems, it is extremely useful to be able to collect and analyze data about incoming transactions. For example, a securities firm may wish to determine how many telephone calls are completed per time period in a particular geographic area. This would allow more efficient scheduling of human agents to man telephones. A securities firm may also wish to know how much money a particular caller has invested with the firm and what types of investments a particular caller is interested in so that information about investments that would be particularly interesting to that caller may be mailed to him or her.

Using telephone calls as an exemplary transaction, typical automated transaction processing systems generate multiple messages related to each incoming telephone call. These messages are sent to other devices and software applications of the system as necessary to completely handle the incoming call. For example, when a telephone call is originally received, a message may be generated for that telephone call that is related to the way in which it should be routed. The message related to routing is sent to a routing process or application. These messages may be used to log information about incoming calls, but existing methods of logging messages have several serious limitations. For example, messages may be routinely logged by the equipment that generates the message on receipt of a telephone call. These messages are typically stored in a text format with various parameters. For example, one prior art call message includes five parameters. As is known, a parameter is a value that is given to a variable, either at the beginning of an operation or before an expression is evaluated by a program. Until the operation is completed, a parameter is effectively treated as a constant value by the program. A parameter can be text (an alphabetic parameter), a number (a numeric parameter), a combination (an alphanumeric parameter), or an argument name assigned to a value that is passed from one routine to another.

Four of the five parameters included in prior art call messages are numeric and one is alphabetic or alphanumeric. At the receiving point, only the first four numeric parameters can be stored because the equipment at the receipt point essentially only recognizes numeric characters from a telephone keypad. Some of the most important information about a telephone call, however, is stored in the fifth parameter, which is alphanumeric. For example, an account holder's name may be stored in the fifth parameter. Therefore, any alphanumeric or alphabetic information will not be available, even though the message to which it belongs is logged at receipt.

Another disadvantage of logging messages related to incoming calls at the receipt point is that the logs used to store the information are typically cyclical logs that are overwritten in turn. For example, in a system including eight cyclical logs, a log may be overwritten in minutes in a high call volume situation.

An additional disadvantage of this logging method is that access to log files is strictly through a text editor or some kind of access tool designed by the supplier of the equipment. Therefore, it is not possible to extract a formatted report using a standard database query language such as would be possible if the information were stored in a relational database. For these reasons, messages currently generated for incoming calls are of little use for record keeping or compiling of statistical information. They are used mostly for debugging.

Another prior art method of using messages generated for incoming calls logs the messages and their accompanying parameters at a later point in the call processing flow. That is, after the call is initially received and sent to a particular routing application, the routing application logs the messages it receives for a call along with its parameters. The routing application logs all five parameters, including the alphanumeric parameter. However, the information logged is in a text format rather than a relational database format. Therefore, it is, again, not possible to easily generate reports using the information. Another disadvantage of this method is that a routing application does not receive messages related to every call received but only those related to particular calls that go to that particular routing application. Therefore, truly complete information regarding calls received is not available at the routing application.

SUMMARY OF THE INVENTION

An embodiment of the invention provides a method for logging information relating to messages generated for incoming calls in an automated call processing system. Embodiments of the invention further provide a method for logging both numeric and alphanumeric parameters related to incoming calls. Particular embodiments provide a method for storing information about incoming telephone calls in a relational database which can easily be queried using a structured query language.

An automated transaction processing system is described. An embodiment of the invention is a machine implemented method for tracking information regarding electronic transactions received by an automated transaction processing system. The method includes the steps of initializing an output file and receiving multiple messages related to a transaction. Each of the messages has several parameters, at least one of which is alphabetic or alphanumeric. The method also includes the steps of converting the associated parameters to a comma separated variable (CSV) format, storing the associated parameters in the CSV format in the output file; and transferring the output file to a database.

DETAILED DESCRIPTION OF THE PRESENT INVENTION

The following detailed description sets forth numerous specific details to provide a thorough understanding of the invention. One of ordinary skill in the art will appreciate, however, that the invention may be practiced without these specific details. In other instances, well-known methods, procedures, protocols, components, algorithms, and circuits have not been described in detail so as not to obscure the invention.

A machine implemented method for tracking information regarding transactions received by an automated transaction processing system is described. In one embodiment, the machine includes a processor and the method provides for the logging and storage of a plurality of messages associated with telephone call received. Information regarding telephone calls received is converted to a standard relational database format for storage in a relational database where it can be easily accessed using a structured query language (SQL).

Figure 1:
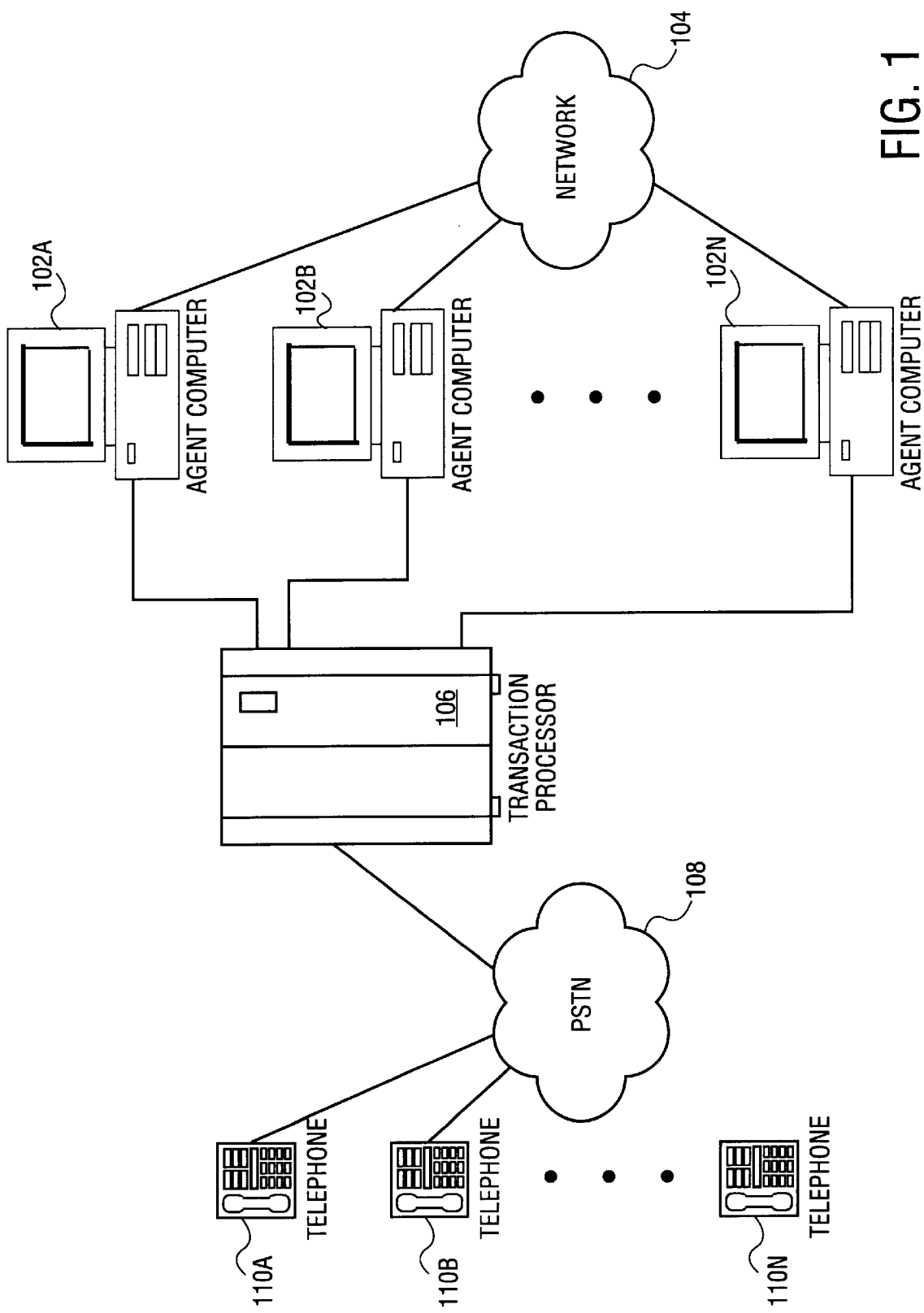
FIG. 1 is a block diagram of one embodiment of an automated transaction processing system.

FIG. 1 is a block diagram of a transaction handling and distribution system that may be used with the present invention. Although any type of electronic transaction may be handled and distributed by the system of FIG. 1, only telephone transactions are shown and described. Telephones 110a–110n are connected through public switched telephone network (PSTN) 108 to transaction processor 106. Telephones 110 may be any type of telephone commonly used in homes or businesses. If telephones 110 are rotary telephones rather than push button telephones, however, telephones 110 may not be able to access all the functionality of system 100.

Transaction processor 106 is an automated call handling and distribution unit that includes hardware and software for receiving and processing telephone calls through PSTN 108. Transaction processor 106 includes a processor for controlling multiple functions performed by transaction processor 106 in connection with each telephone call received. For example, transaction processor 106 may associate a telephone call with a particular caller. Transaction processor 106 typically uses information received about the telephone call to route the telephone call to a particular agent computer 102. For example, transaction processor 106 may query a human caller for a type of identifier such as a social security number. Transaction processor 106 then uses the identifier to access existing records about the caller, decide which agent computer 102 is appropriate to handle the call, and forward the call to the appropriate agent computer 102. Transaction processor 106 also uses computer/telephony integration (CTI) to cause records relating to the particular caller to be accessed and displayed on the appropriate agent computer 102.

Agent computers 102a–102n are each connected to transaction processor 106 and are further connected to each other through network 104. Agent computers 102 may be located remotely from transaction processor 106. Some of agent computers 102, for example, may be located in one state and some of agent computers 102 may be located in another state while transaction processor 106 is located in a third state.

Figure 2:
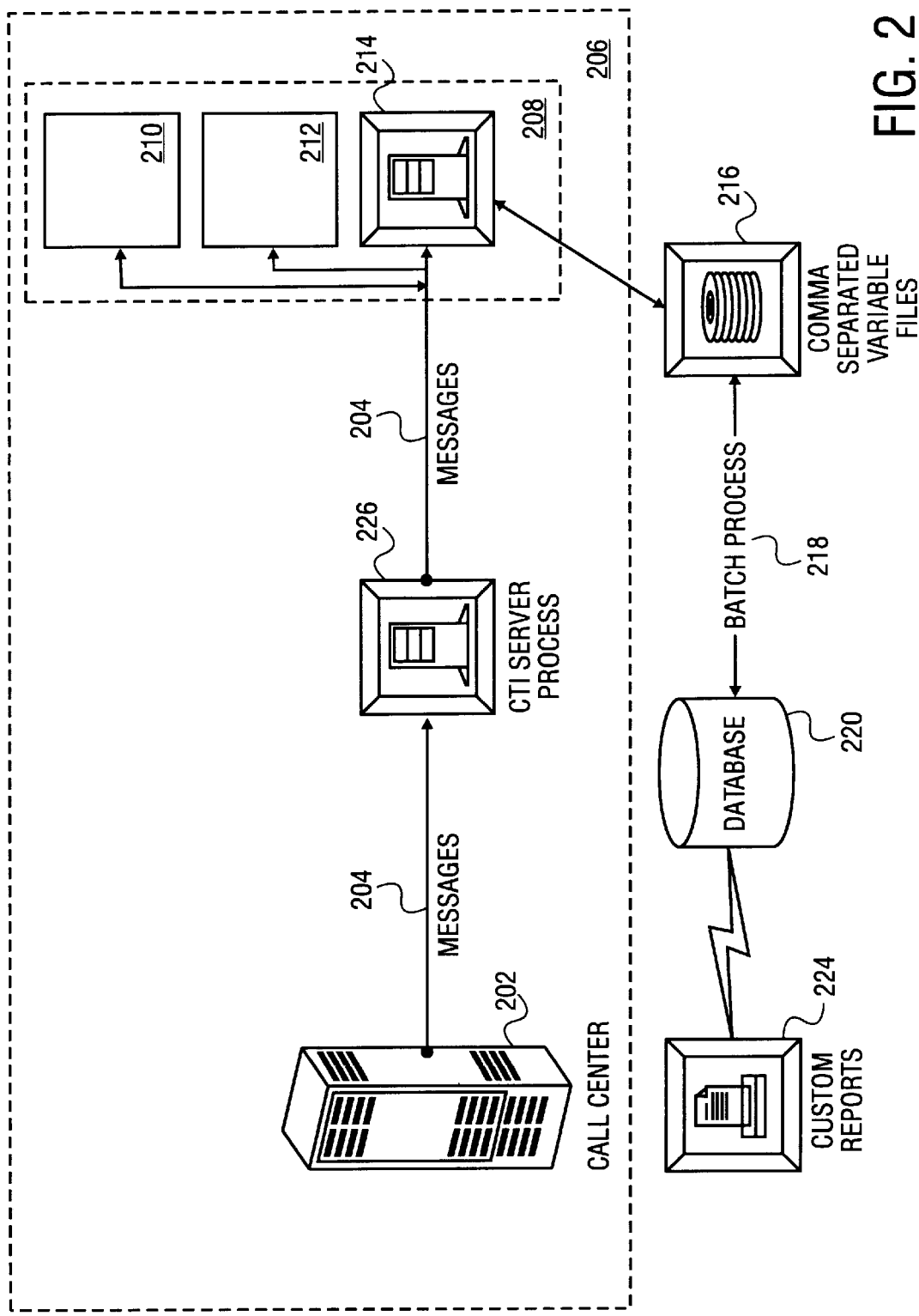
FIG. 2 is a block diagram of one embodiment of a transaction processing system and a database.

FIG. 2 is a block diagram of one embodiment of an automated transaction processing and distribution system according to the present invention. Transaction processor 206 is one embodiment of a transaction processor. Elements of transaction processor 206 include call center 202, CTI server process 226, and CTI applications 208. In this embodiment, call center 202 initially receives all incoming telephone calls and generates multiple messages associated with each telephone call. Call center 202 also generates messages related to outgoing telephone calls. Call center 202 originates all messages according to its configuration. The configuration of call center 202 is determined by call control tables (CCT). For example, categories of messages associated with telephone calls include outgoing messages (call related), outgoing messages (not call related), incoming responses (not call related), incoming responses (call related), incoming requests, and outgoing responses.

In one embodiment, messages consist of message fields and 1-byte field separators. A message can be of variable length with variable length fields or fixed length with fixed length fields. If variable length fields are used, network traffic is typically reduced and more flexibility is present in the system for changes and upgrades.

In one embodiment, messages generated by call center 202 each have up to five parameters. Four of the parameters contain numeric information, while the fifth parameter contains alphanumeric information. These parameters are referred to as the A, B, C, D and E parameters, respectively. The E parameter is an alphanumeric parameter and typically contains some of the most important information related to the telephone call. For example, the E parameter may contain a name of an account or a caller. Call center 202 maintains cyclical logs of the A, B, C and D parameters but does not have the capability to store the E parameter because of its alphanumeric nature.

After generating the messages with their associated parameters, call center 202 transfers the messages to CTI server process 226. The messages may be required by various other processes in the system that handle different aspects of the telephone call. CTI server process 226 receives messages from call center 202 and distributes them to various CTI applications. Particular CTI applications listen for particular messages. CTI applications shown are CTI routing application 210, screen pop up application 212, and CTI logging process 214. The CTI applications shown are exemplary, and many other CTI applications may exist. CTI router application 210 is the only CTI application shown that both receives messages from CTI server process 226 and transmits information back to CTI server process 226. In particular, CTI router application 210 receives messages from CTI server process 226, and using information in parameters associated with the messages performs a database lookup or some database algorithm to access information pointed to by the message parameters. CTI router process 210 then returns pertinent information to call center 202 through CTI server 226. Call center 202 uses the information received to determine how to route the telephone call.

Screen pop up CTI application 212 receives messages and associated parameters that allow it to identify situations where it is necessary to cause information relating to a particular telephone to appear on a particular agent computer screen.

CTI logging application 214, unlike other CTI applications, receives every message transmitted by CTI server process 226. CTI logging application 214 receives messages and associated parameters, including alphanumeric parameters, in a text format. CTI logging application 214 reformats each set of parameters received into a comma separated variable (CSV) format. As is known in the art, files in CSV format may be easily read by many standard relational database programs which extract information from the CSV file and store it in columns and rows in the relational database. In this embodiment, CSV files 216 are written by CTI logging application 214 and the size of a particular file is determined at the start of the logging process, as will be explained further below. In this embodiment, a batch process 218 that is compatible with relational database 220 is run as a chron job that accesses CSV files 216 at regular intervals to transfer the information contained therein to relational database 220. As is known, a chron job is a particular function performed by software on a regular basis.

Unlike message information that may be stored in call center 202, the message information stored in database 220 is in a readily accessible relational database format and further, is not cyclically overwritten. In addition database 220 stores alphanumeric information while call center 202 does not. A report generating tool provided with a relational database 220 is used to generate custom reports 224. Relational database 220 may, for example, be a database provided by Sybase Corporation, Oracle Corporation, or Access Corporation or any other relational databases using standard relational database formats.

Figure 3:
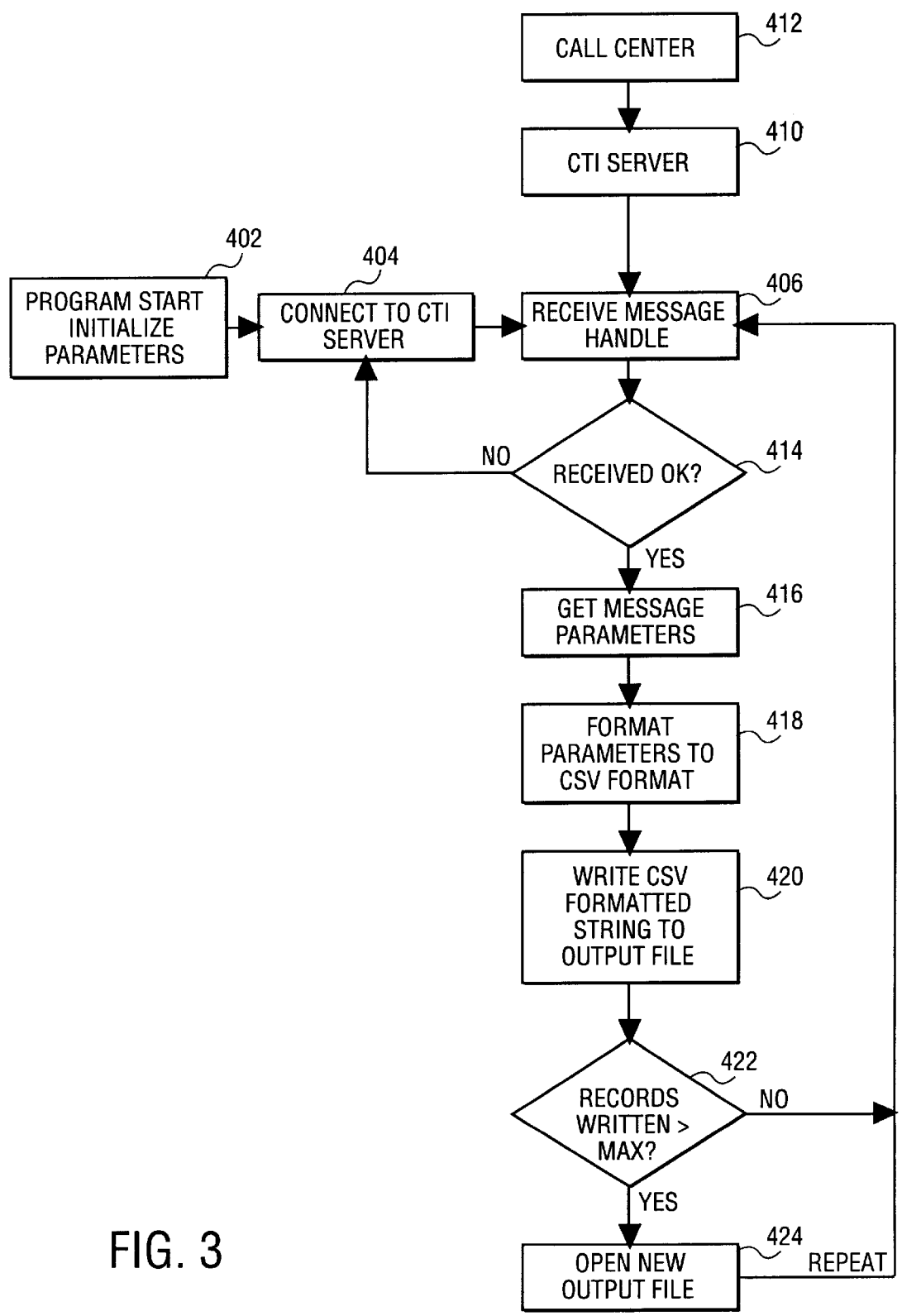
FIG. 3 is a diagram of one embodiment of a process flow including computer/telephony integration (CTI) message logging.

FIG. 3 is a flow diagram of message logging according to the embodiment of FIG. 2. At block 402 the logging program is started, including initializing parameters. For example, a filename and extension of an initial CSV file are assigned to the first CSV file that will be receiving CSV formatted message parameters. In addition, a time stamp is assigned to each message. There may be multiple messages for a single telephone call. At step 404, a connection is completed to the CTI server, shown as CTI server 410. CTI server 410 receives messages from call center 412. The connection completed in step 404 is, in this embodiment, a transmission control protocol/internet protocol (TCP/IP) connection between CTI logging application 214 and CTI server 410. At step 406, CTI logging application 214 receives a message handle from the message received. As is known, a handle is a pointer to a pointer, that is, a parameter that contains the address of another parameter, which in turn contains the address of the desired object.

At decision block 414, it is determined whether the message handle was correctly received. For example, network problems can occur causing the TCP/IP connection to go down. If the message handle has not been received, a reconnection to CTI server is attempted by repeating step 404. If the message handle has been received, parameters are extracted from the message at step 416. Every parameter from every message received is extracted. Parameters that do not apply to a certain message are blank. At step 418, the parameters are formatted into a CSV format and then written at step 420 to a CSV output file. At decision block 422 it is determined whether the number of records (formatted CSV strings) is greater than a maximum number. The maximum number of records is set at initialization step 402. If the number of records written is not greater than the maximum number then another message handle is received at step 406. If the number of records written is greater than the maximum number then the current file is closed and a new output CSV file is opened. This includes incrementing the current filename extension. For example, the initial filename includes the full path name plus an extension such as "0.1". A new output file and sequence would then have the name "[full path name] 0.2". A new message handle is then received at step 406 and the process of formatting and writing to the new output file continues.

Figure 4:
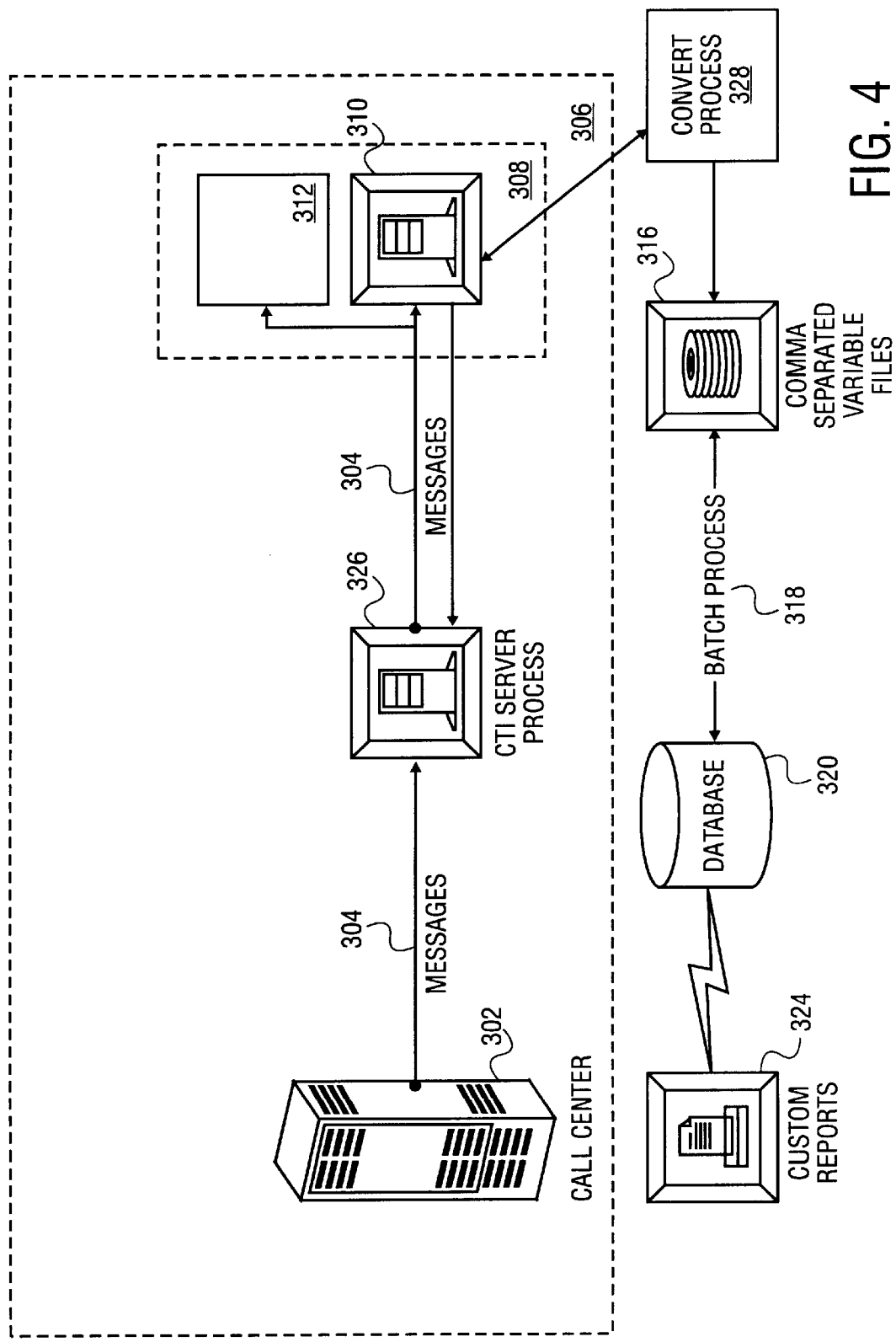
FIG. 4 is a block diagram of an alternate embodiment of a transaction processing system and database.

FIG. 4 is a diagram of elements of an alternate embodiment of an automated call processing and distribution system. Transaction processor 306 includes call center 302, CTI server process 326, and CTI applications 308. Call center 302 and CTI server process 326 operate similarly to call center 202 and CTI server process 226. In addition, messages 304 are the same type of messages as messages 204. CTI application 308 includes screen pop up application 312 and CTI routing application 210. In other embodiments, CTI application 308 may include many more CTI applications to perform particular functions. CTI applications 308 do not include a CTI logging application as in FIG. 2. Screen pop up CTI application 312 functions similarly to screen pop up CTI application 212. CTI routing application 310 includes the functionality of maintaining a record of messages received by CTI routing application 310. CTI routing application 310 may be one of multiple CTI routing applications connected to CTI server process 326. Each CTI routing application in the particular embodiment has the capability to log messages that it receives. Messages logged at a particular CTI routing application such as CTI routing application 310 will be a subset of messages sent by CTI server process 326 because each CTI routing application 310 only receives particular messages. The messages logged by CTI routing application 310 are in a text format. These files are periodically accessed by convert process 328 which converts them to a CSV format and stores them in CSV files 316. CSV files 316 can then be accessed by batch process 318 and stored in relational database 320, which in turn can be accessed to generate custom reports 324.

Figure 5:
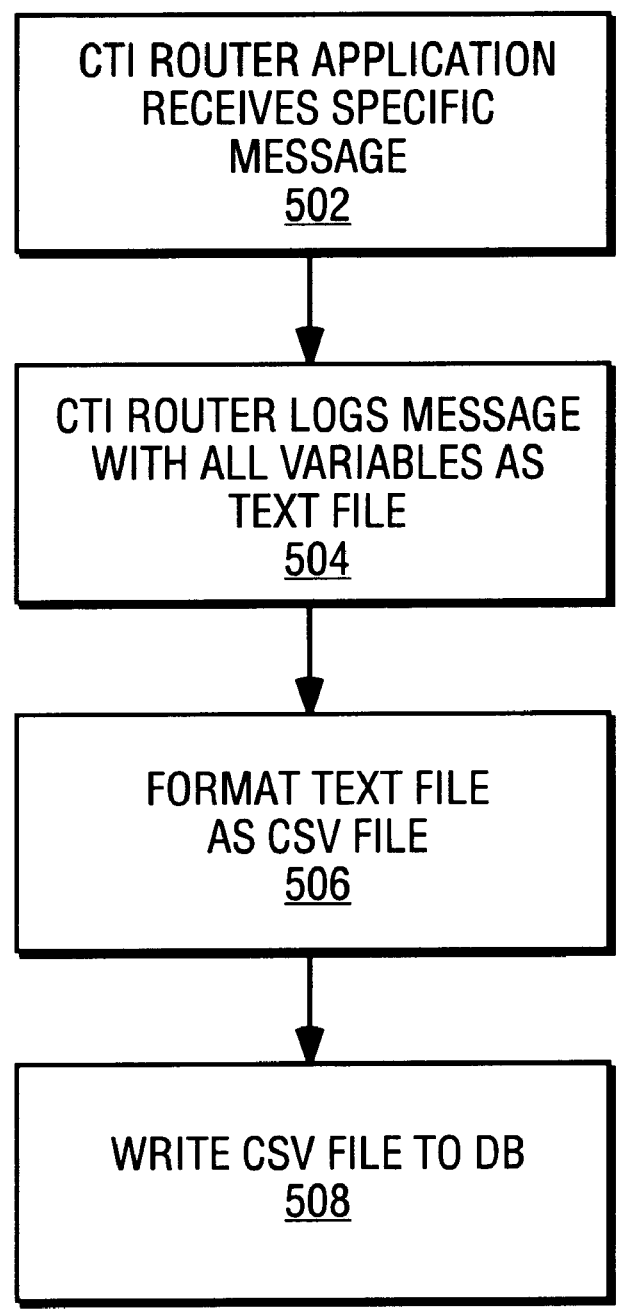
FIG. 5 is a diagram of a process flow according to the embodiment of FIG. 4.

FIG. 5 is a flow diagram of a message logging process according to the embodiment of FIG. 4. At step 502, a CTI routing application receives a specific message. At step 504, the CTI router application logs the message with all associated parameters, including alphanumeric parameters, as a text file. At step 506, the text file is formatted as a CSV file, and written as a CSV file to a relational database in step 508.

What is claimed is:

1. A machine implemented method for tracking information regarding electronic transactions received by an automated transaction processing system, comprising:

receiving a plurality of messages related to a transaction, wherein each of the messages comprises a plurality of parameters, at least one of the parameters including an alphabetic parameter;

converting the plurality of associated parameters to a format that is compatible with a relational database;

storing the plurality of associated parameters in the format in an output file; and transferring the output file to a database.

2. The machine implemented method of claim 1, further comprising:
   connecting to a computer/telephony integration (CTI) server;
   receiving a handle related to a particular message; and
   using the handle to access parameters associated with the particular message.

3. The machine implemented method of claim 2, further including:
   initializing the output file, including setting a maximum number of records to be stored in the output file;
   determining whether the number of records written to the output file is the maximum;
   if the number of records written is the maximum, initializing a next output file, including updating a filename extension; and
   if the number of records is not the maximum, receiving a next handle related to a next particular message.

4. The machine implemented method of claim 3, further comprising:
   querying the database for information related to telephone calls received; and
   in response, generating a report including the information.

5. The machine implemented method of claim 4, further comprising:
   receiving information from a CTI application regarding a type of message that the CTI application uses;
   when a message of the type is received, transmitting the message to the CTI application; and
   if the CTI application alters a parameter associated with the message, receiving the altered parameter.

6. The machine implemented method of claim 5, wherein the CTI application is a routing application, and wherein the routing application maintains a log of messages received by the routing application.

7. The machine implemented method of claim 6, wherein an identity of any CTI application that received a message is a parameter associated with the message.

8. The machine implemented method of claim 7, wherein the information includes:
   a number of calls connected in a period of time;
   a number of calls completed in the period of time;
   information related to routing of a particular call; and
   a customer account related to a particular call.

9. A machine-readable medium storing a sequence of instructions that, when executed by a machine, cause the machine to:
   generate a message for a telephone call received from a public switched telephone network, including a set of parameters, wherein the set of parameters includes at least one alphabetic parameter;
   transmit the message to a computer/telephony integration (CTI) server;
   using a message handle associated with the message, retrieve the set of parameters, including at least one alphabetic parameter;
   convert the set of parameters to a format that is compatible with a relational database; and
   write the converted set of parameters as a record to an output file.

10. The machine-readable medium of claim 9, wherein the instructions further cause the machine to transmit the message from the CTI server to a particular CTI application based upon at least one parameter and based upon request information from the CTI application.

11. The machine-readable medium of claim 10, wherein the set of parameters includes an indication of which CTI application requested the message.

12. The machine-readable medium of claim 11, wherein the instructions, when executed, further cause the machine to write the output file to a relational database.

13. The machine-readable medium of claim 12, wherein the instructions, when executed, further cause the machine to query the relational database for information stored therein.

14. The machine-readable medium of claim 13, wherein the information comprises:
   a number of calls connected in a period of time;
   a number of calls completed in the period of time;
   information related to routing of a particular call; and
   a customer account related to a particular call.

15. The machine-readable medium of claim 14, wherein the instructions, when executed, further cause the machine to create a report using the information.

16. The machine-readable medium of claim 15, wherein the relational database is queried using a structured query language.

* * * * *